No. 861,720. PATENTED JULY 30, 1907.
W. T. GOLLEDGE & R. H. HARRY.
MACHINE FOR CUTTING FABRICS.
APPLICATION FILED NOV. 29, 1905.
2 SHEETS—SHEET 1.
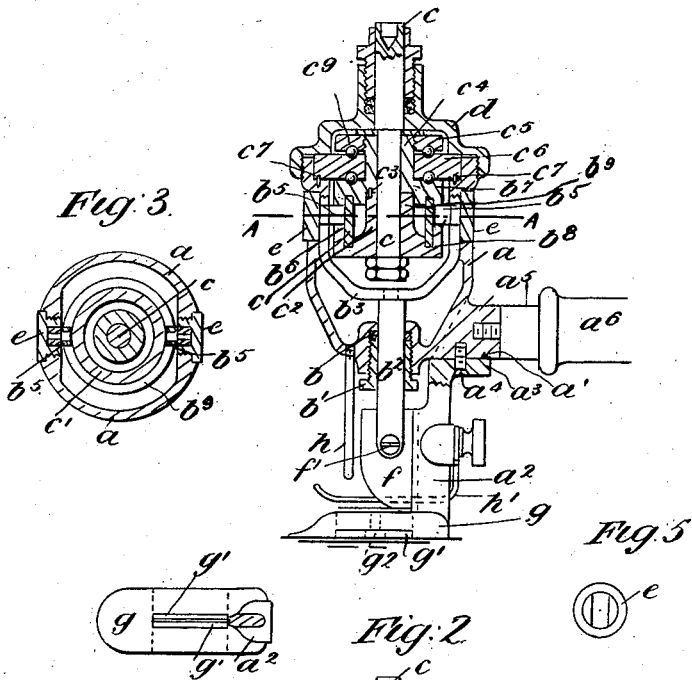
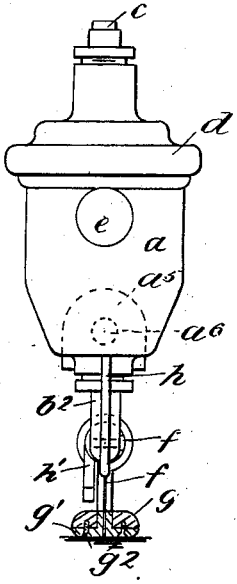
Witnesses
Inventors
W. T. Golledge
R. H. Harry
By Stewart & Stewart
Attys.

No. 861,720. PATENTED JULY 30, 1907.
W. T. GOLLEDGE & R. H. HARRY.
MACHINE FOR CUTTING FABRICS.
APPLICATION FILED NOV. 29, 1905.

2 SHEETS—SHEET 2.

Witnesses.
John Imire
W. A. Williams

Inventor.
W. T. Golledge.
R. H. Harry.

by, Stewart & Stewart
Attorneys.

UNITED STATES PATENT OFFICE.

WILLIAM THOMAS GOLLEDGE AND ROBERT HUMPHRYS HARRY, OF LONDON, ENGLAND.

MACHINE FOR CUTTING FABRICS.

No. 861,720.     Specification of Letters Patent.     Patented July 30, 1907.

Application filed November 29, 1905. Serial No. 289,690.

Be it known that WILLIAM THOMAS GOLLEDGE and ROBERT HUMPHRYS HARRY, subjects of the King of the United Kingdom of Great Britain and Ireland, and residents of 53 Curtain road, London, England, have invented certain new and useful Improvements in Machines for Cutting Fabrics, of which the following is a specification.

This invention relates to an improved machine for cutting fabrics and is designed for use by clothiers and others.

The invention has for its object to provide a simple and effective machine driven by power derived from any suitable source transmitted thereto by means of flexible shafting and so arranged and constructed as to permit of its ready manipulation by hand during the cutting operation.

In carrying the invention into effect we employ two shear blades one of which is preferably fixed while the other is reciprocated in the vertical plane. The blades aforesaid are carried by a suitable frame which may also form a case for the operating mechanism and which frame is provided with a handle for effecting the manipulation during the cutting operations. The movement of the reciprocating blade is effected by means of a cam, or other equivalent device, mounted upon a shaft or spindle disposed with its center in the vertical plane. A suitable coupling or connection is provided upon the aforesaid shaft for the attachment of the flexible shafting. The movable blade is secured to a rod working in suitable guides and to which rod motion is imparted through a link or connecting rod operated by the cam or its equivalent as aforesaid. An adjustable guide or guard is provided to prevent the material impeding the action of the shears.

In order that the invention may be the better understood drawings are appended illustrating two forms of the invention in which:—

Figure 6:
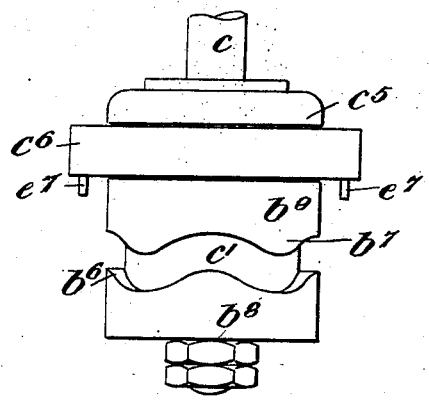
Figure 7:
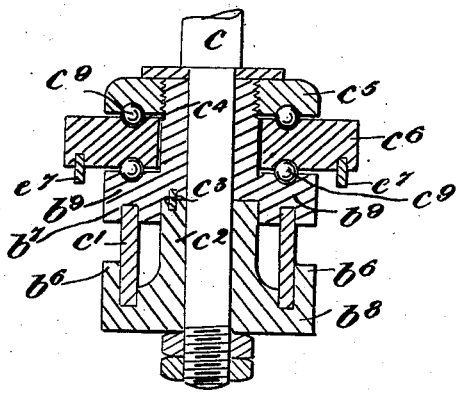

Figure 1 is a side elevational view partly in section of a machine constructed in accordance with the invention, Fig. 2 is a front view of certain parts shown in section. Fig. 3 is a section on line A A Fig. 1. Fig. 4 is a plan partly in section of the supporting foot of the machine. Fig. 5 is a front view of one of the guides for the reciprocating fork actuating the cutter. Fig. 6 is an elevational view to an enlarged scale of certain parts removed from the casing. Fig. 7 is a longitudinal sectional view of the parts shown in Fig. 6.

Referring to the accompanying drawings Figs. 1 to 5 $a$ indicates a cylindrical casing connected at $a^1$ to a foot $a^2$ by means of the horizontal plate $a^3$ through which passes a screw $a^4$ tapped into the projection $a^5$ the said projection being circular and provided upon its under side with a flat surface for the attachment of the foot aforesaid. The projection $a^5$ also serves as a means for the attachment of the handle $a^6$ by which the manipulation of the machine is effected during the cutting operation. The case $a$ at its lower end is provided with a stuffing box $b$ and gland $b^1$ through which passes the vertical rod $b^2$ to the upper end of which is secured the fork $b^3$. The ends of the fork are provided with pins carrying rollers $b^5$ engaging a cam surface formed upon the vertical walls $b^6$ $b^7$ upon disks $b^8$ $b^9$ the part $b^8$ being provided with a boss $c^2$ recessed into the undersurface of the disk $b^9$ the parts being secured in rotative engagement by means of pins such as $c^3$ and receiving motion from the spindle $c$ to which the uppermost disk is secured by means of a key or other suitable means. A distance piece $c^1$ is also provided to insure the proper spacing of the edges of the walls $b^6$ $b^7$ which walls as aforesaid form the cam for effecting the vertical reciprocation of the knife their upper edges presenting an undulated outline as shown in Fig. 6. The distance piece $c^1$ is recessed into the respective upper and lower faces of disks $b^8$ and $b^9$ and prevents the lateral displacement of the fork $b^3$ by limiting the inward movement of the rollers $b^5$. The vertical displacement of the disk $b^8$ is prevented by lock nuts upon the lower end of the spindle $c$. Clamped between the upper surface of the casing $a$, which is suitably recessed to secure it, and the cap $d$ closing the end of casing $a$ is a disk $c^6$ secured against rotation by means of pins such as $c^7$ entering recesses formed in the casing. The cap $d$ is provided with a central aperture through which passes a boss $c^4$ formed upon the upper surface of the disk $b^9$ which boss projects beyond the surface of disk $c^6$ and is provided with a screw thread engaging a thread formed in the disk $c^5$, a washer being interposed between the upper surface of the disk and a shoulder formed upon the spindle $c$ the lower portion of which is of reduced diameter. Ball races are formed in the upper and lower surfaces of disk $c^6$ adapted to receive balls $c^9$ $c^9$ in order that the friction between the disks and the non rotative part $c^6$ may be as little as possible. The cap $d$ is provided with a stuffing box and gland through which passes the spindle $c$. The whole of the working parts are thus inclosed and the entry of dust or other injurious matter is prevented. Oil holes may be provided for the introduction of a lubricant.

In order to insure the proper vertical positioning of the fork $b^3$ guides are provided and are formed in the face of the bosses $e$ and fixed into the sides of the casing the front of the said bosses being recessed or channeled as shown in Fig. 5.

$f$ indicates a cutter secured to the lower end of the rod $b^2$, which is slotted for the purpose, by means of screw $f^1$. The cutter is shaped as shown the back thereof working in a recess formed in the vertical portion of the foot $a^2$.

The foot at its lower end terminates in a horizontal plate $g$ slotted to receive the L shaped plates $g^1$ secured to the foot by means of screws $g^2$, the underside of the plate being slotted to contain the horizontal members of said plates.

A depending rod $h$ forms a guard to protect the operators fingers and a spring $h^1$ adjustably secured to the vertical member of the foot is provided to prevent the material rising during the cutting operation.

Motion is transmitted to the vertical spindle by means of a flexible shaft, not shown and connected to the upper end of said spindle in any suitable manner. Upon the rotation of the shaft the cam surfaces acting upon the upper end of the fork $b^3$ cause the rod $b^2$ to be rapidly reciprocated in the vertical plane and the machine being pushed forward by means of the handle the blade is brought into contact with the cloth or the like and the cutting effected. The edges of the plate $g$ are suitably rounded or curved in order to facilitate the passage of the machine through the cloth.

The action of the machine will be readily apparent from the foregoing description, the cutter being reciprocated in the vertical plane upon the rotation of the crank and the manipulation of the machine being effected by means of the handle.

What we claim is:—

1. A machine for cutting fabrics, comprising a cylindrical casing having at one end a guide for a reciprocating cutter bar and at the other a bearing for a rotative element designed to be connected to a flexible shaft, a foot or support upon the casing, a presser foot for the material being cut, a knife guard, a handle for manipulating the device and a cam operated reciprocating cutting blade connected to a forked rod the upper ends of which support rollers engaging the cam upon opposite sides of its periphery and guides for the said rod formed upon the inside of the main casing.

2. In a machine for cutting fabrics, the combination with a driven shaft and a cam therein, of a forked rod carrying a cutting blade and the upper ends of which rod engage the driving cam upon opposite sides of its periphery and guides for said rod formed respectively at the lower end of the main casing and upon the interior thereof.

3. In a machine for cutting fabrics, the combination with a shaft to be driven, a pair of disks spaced apart and mounted on the shaft, cam faces on the opposing faces of the disks whereby the disks form a cam-way, a rod provided with a fork at one end carrying means to engage the cam-way whereby the rod will be reciprocated upon the rotation of the shaft, a cutter at the free end of the rod and a foot with which said cutter coöperates.

4. In a machine for cutting fabrics, an outer casing comprising a hollow body of circular cross section provided at its lower end with a stuffing box and gland forming a guide for a reciprocating rod carrying a cutting blade and at its upper end having a cap also provided with a stuffing box and gland serving as a bearing for a rotative element connected to a flexible shaft and plugs screwed into the wall of the casing at diametrically opposite positions such plugs having on their inner faces guide ways engaging the vertical members of a forked termination upon the reciprocating cutter rod.

5. In a machine for cutting fabrics, the combination with a rotative element driven by means of a flexible shafting, of a fixed disk rigidly secured within the main casing and having ball races upon its upper and lower faces, a similar race being formed upon the upper face of the driving cam and a second disk adjustably secured to an extension upon the said cam provided with a ball race upon its under surface and balls located in the said races and engaging the upper and lower faces of the fixed disk.

In witness whereof we have hereunto set our hands in presence of two witnesses.

WILLIAM THOMAS GOLLEDGE.
ROBERT HUMPHRYS HARRY.

Witnesses:
F. A. S. GWATKIN,
WM. ALEXANDER.